United States Patent [19]
Roberts et al.

[11] 4,275,481
[45] Jun. 30, 1981

[54] CARCASS SCALPING

[76] Inventors: Colin A. Roberts, 15 Dunvegan Pl., Hamilton; John S. Nelson, Railway Rd., Whakatu, Hawkes Bay; David E. Annan, 5a Cuffs Rd., Christchurch 6; Angus A. J. Robertson, No. 1 R.D., Rangiora, all of New Zealand

[21] Appl. No.: 82,322

[22] Filed: Oct. 5, 1979

[30] Foreign Application Priority Data

Oct. 11, 1978 [NZ] New Zealand ............ 188635

[51] Int. Cl.³ ............................................. A22B 5/16
[52] U.S. Cl. ...................................... 17/50; 17/21
[58] Field of Search ............... 17/21, 50; 99/584–589

[56] References Cited
U.S. PATENT DOCUMENTS 4,127,917 12/1978 Pohio et al. .................... 17/21

FOREIGN PATENT DOCUMENTS 7503945 10/1976 Netherlands .................... 17/21
1524778 9/1978 United Kingdom ............ 17/21

Primary Examiner—Willie G. Abercrombie
Attorney, Agent, or Firm—Cushman, Darby & Cushman

[57] ABSTRACT

Apparatus for machine scalping and possibly total pelting of a worked up carcass of an animal such as a sheep which uses a composite roller capable of being machine rotated in at least one rotational direction, the roller having a first portion and a second portion movable with respect to each other so as to clamp before the rolling off of the scalp and to release upon reversal after previous operation the grip on the scalp. The apparatus is actuable so as to cause the phased movements required for first gripping the pelt for scalping and then the release of any pelt removed by the composite roller.

10 Claims, 23 Drawing Figures

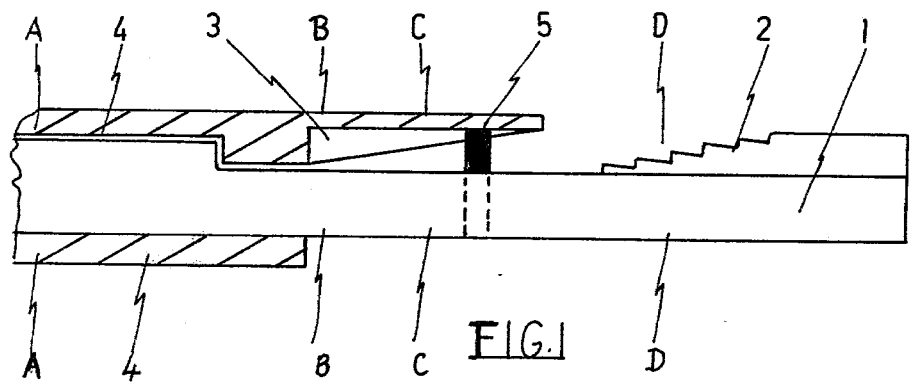
FIG. 1
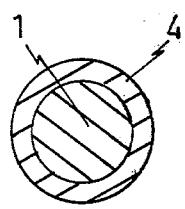 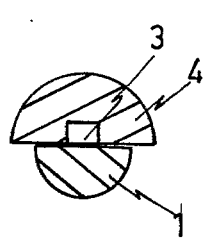 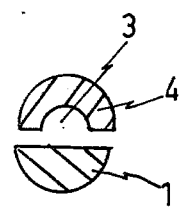 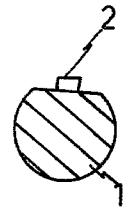
FIG. 2  FIG. 3  FIG. 4  FIG. 5
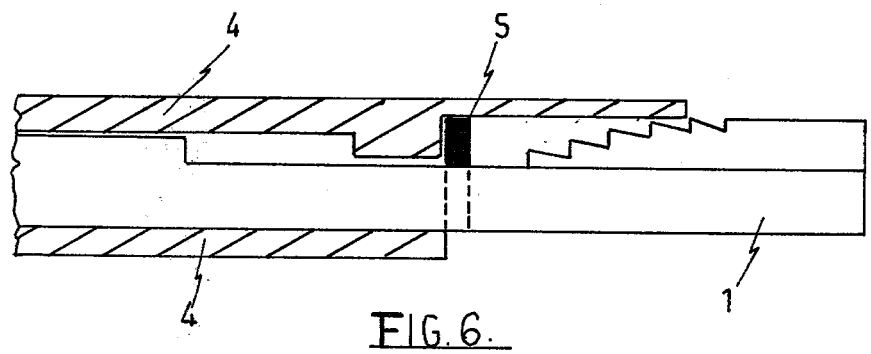
FIG. 6
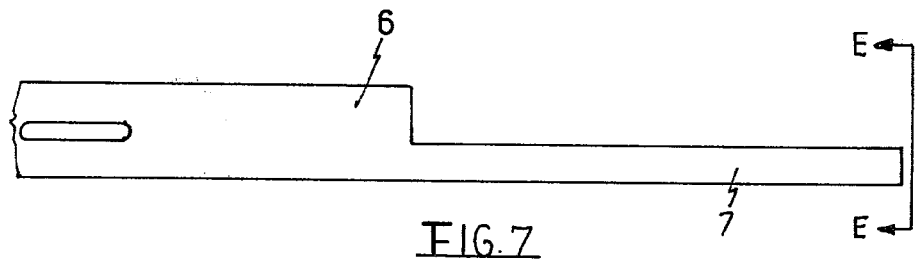
FIG. 7

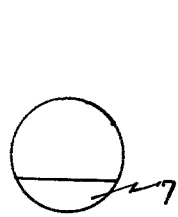
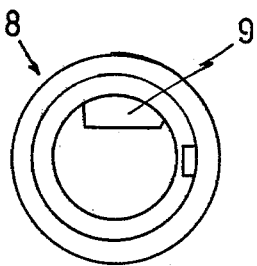
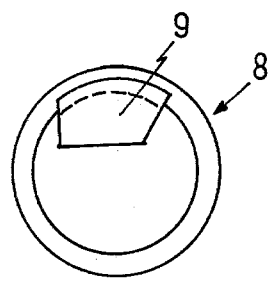
FIG. 8  FIG. 10  FIG. 11
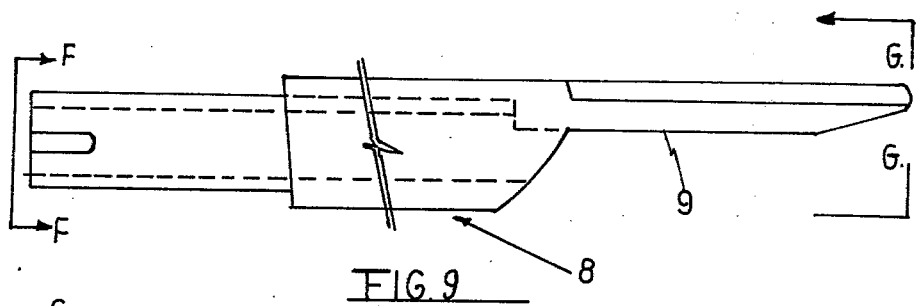
FIG. 9
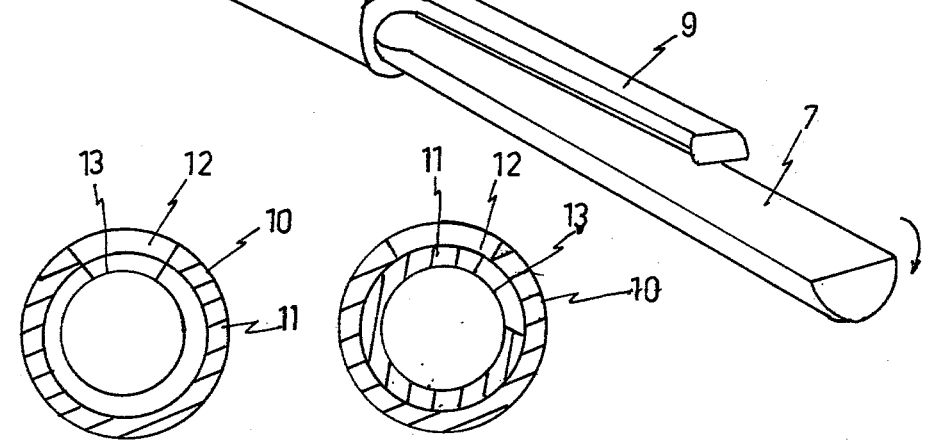
FIG. 12
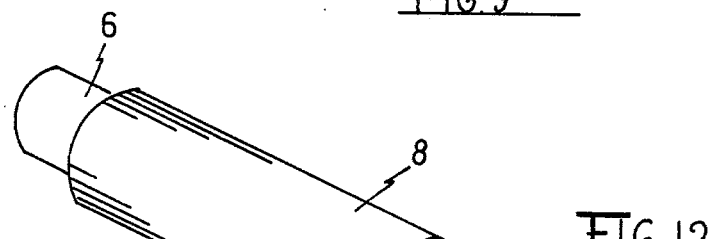
FIG. 13  FIG. 14

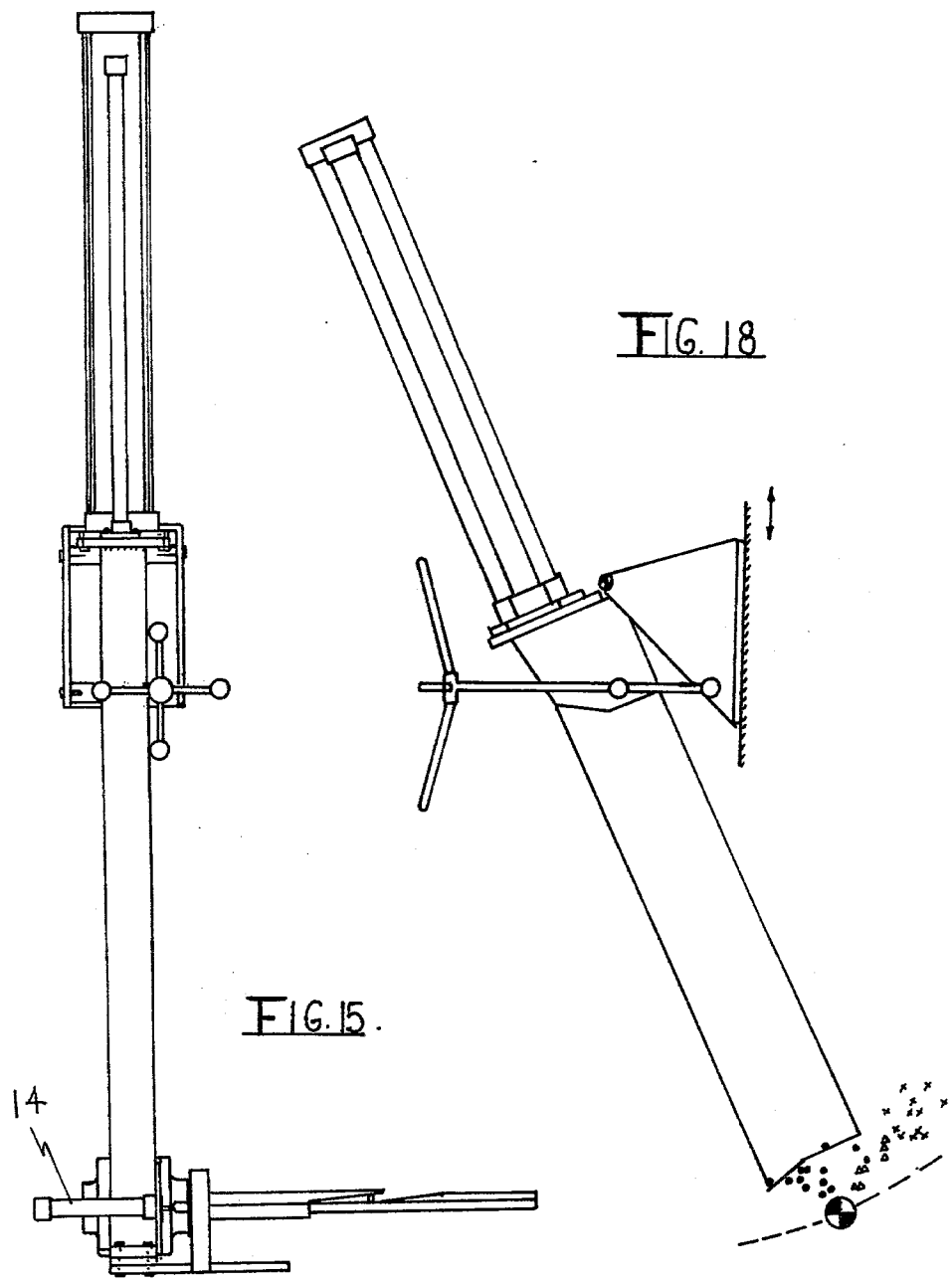

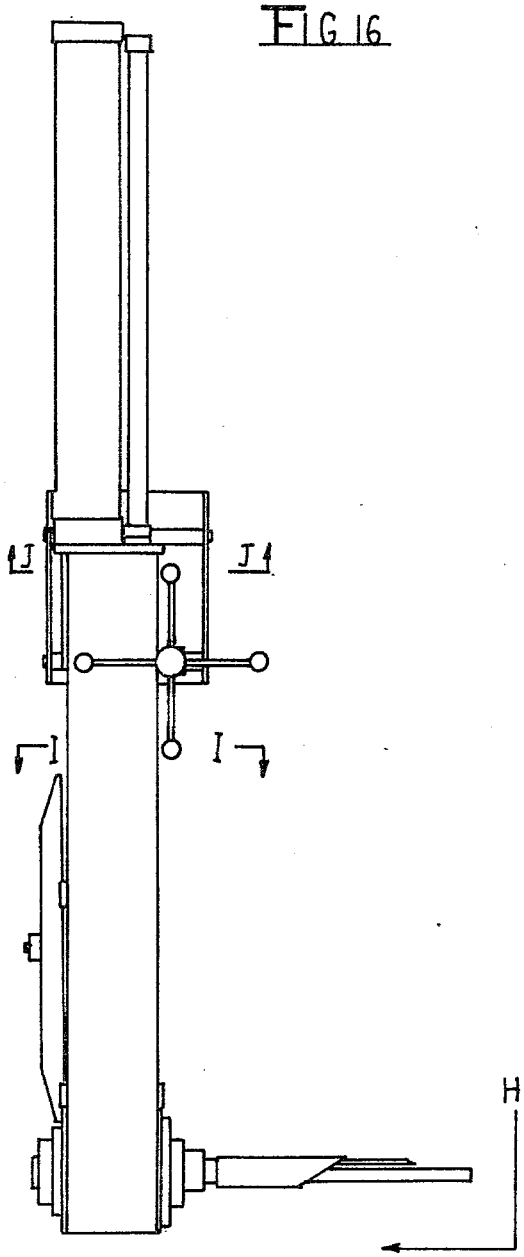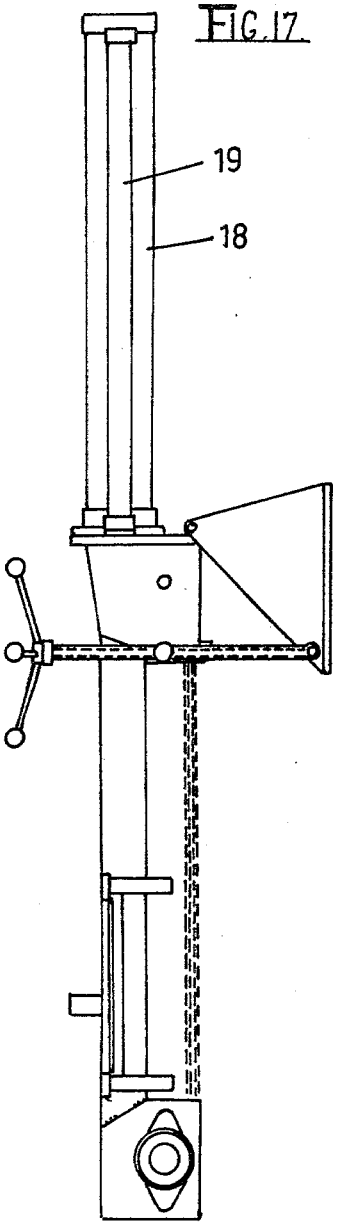

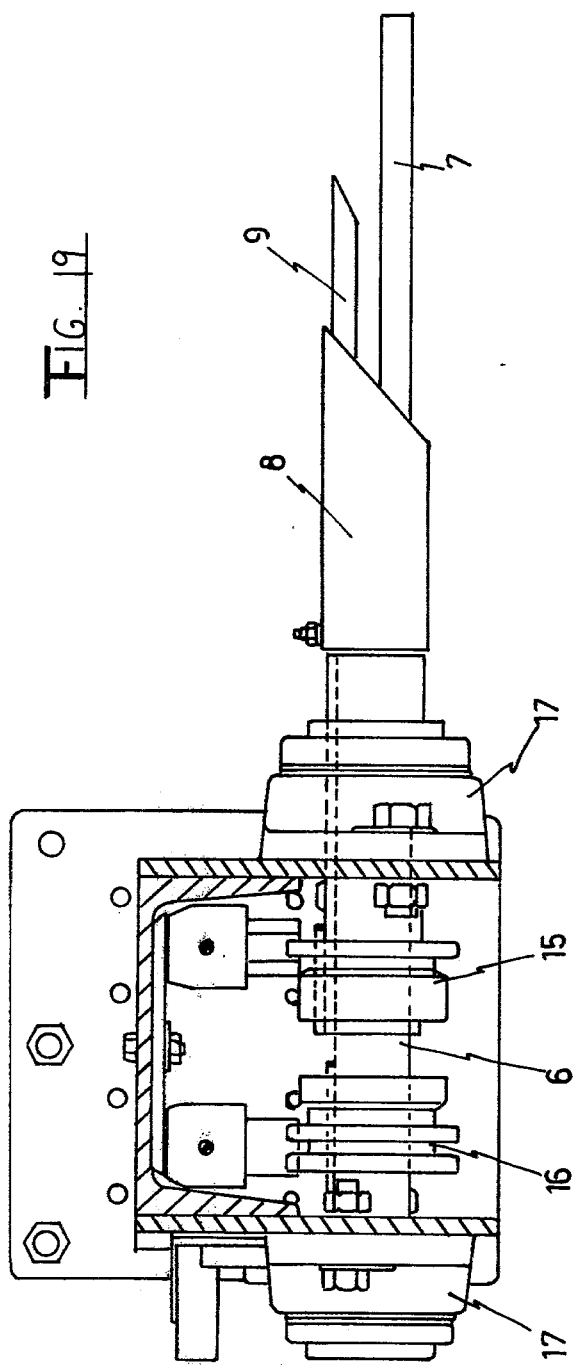

CARCASS SCALPING

BACKGROUND OF THE INVENTION

The present invention relates to improvements in or relating to means and methods applicable to the scalping of the heads of slaughtered animals such as sheep, beef animals, deer and the like.

In our New Zealand patent specification No. 181447 (equivalent to each of U.S. Pat. No. 4,127,917, U.K. Pat. No. 1524778 and Australian patent application No. 26958/79) the full disclosure of which is hereby herein incorporated by way of reference there is disclosed a pelting system which involves the use of a small diameter roller which is used to roll off a carcass the pelt of the animal and in particular that of a sheep substantially as a sheet. For this purpose the head region of the sheep is worked up so that the pelt can be removed by rolling it substantially as a sheet. The rolling of the roller is effected in such a way that the inside of the pelt is exposed around the roller as the roller winds the pelt completely from the carcass. After the pelt has been removed the roller is reversed to allow the easy removal of the pelt from thereabout.

The preferred working up method for such a system was as follows:

(1) The animal is stunned and then spear stuck. Care must be taken that the atlas joint is not severed.

(2) The carcass is then suspended by the left rear leg on a conventional leg hook which is suspended from the main rail.

(3) The area around the anus is skinned right up to the inside tip of the tail.

(4) A slit cut is made from the anus through between the rear legs and up to a point just past the testes or udder.

(5) A small clearing cut is made between the legs separating the skin from the carcass to about 3" each side of the centre line.

(6) The fore legs are then placed in a conventional spreader which is lifted up on to the spreader rail.

(7) The Y cut is then made and the neck and shoulders cleared in a conventional manner, the Y cut going down the fore legs to the point of the lower jaw.

(8) The cheeking is then carried out with the ear canals being severed during this operation.

(9) A cut is then made over the bridge of the nose separating the skin for a distance of about 3" up from the tip of the nose, the nose being removed with the skin.

(10) The brisket is then cleared by preferably using a conventional drill and spade but the pelt is not split.

(11) The rear trotters were cut off above the final joint and in doing this the rear leg is severed from the leg hook.

(12) The pelt (or skin) is then split with a knife from the brisket down to meet the opening already made between the rear legs.

(13) The pelt is the cleared around the navel area as far out as the "wax eyes" only.

(14) The shoulders are then pulled down far enough to allow a pocket to be made through the arch of the neck separating the pelt from the neck of the carcass.

For the purpose of the system of New Zealand patent specification No. 181447 a spiked roller of relatively small diameter was used to which was engaged the lip or nose region of the worked up head of the animal. In the preferred form of the invention of New Zealand patent specification No. 181447 the animal, ideally sheep, were supported solely from its fore legs and the direction of the chain movement was such that the head was advanced first to the rolling off station for pelting. The lip and/or nostril region was gripped and the rolling was commenced which wound the pelt off the head of the animal down its neck down the back bone and then down the back legs. Throughout such movement sufficient constraints on the movement of the carcass are provided to allow the pelt to be parted from the carcass proper at a position in advance of the relative movement of the roller with respect to the carcass. In that method it was preferred that the worked up rear legs be removed as socks.

The commercialisation of the system of the aforementioned New Zealand patent specification No. 181447 did lead to certain difficulties with regard to the means of engagement of the lip/nostril region of the worked up pelt as it was felt that the spiked roller of small diameter did not provide the required safety margin and moreover did not always provide the required symmetry of the rolling i.e. on either side of the back bone of the carcass being pelted.

It is therefore an object of the present invention to provide means and/or methods which will go at least some way to meet the abovementioned disadvantage or which will at least provide the public with a useful choice.

BRIEF SUMMARY OF THE INVENTION

The present invention relates to improvements in or relating to the means and methods applicable to the scalping of the heads of slaughtered animals such as sheep, beef animals deer and the like. In one aspect the invention consists in apparatus for scalping the carcass of an animal such as a sheep, comprising:

composite means providing a composite roller capable of being machine rotated in at least one rotational direction, said composite roller having a first portion and a second portion movable with respect to said first portion between one position where an appropriate region of head pelt of an animal to be scalped can be positioned relative to one of said portions, and another position whereby the two portions can coact to clamp said appropriate region of head pelt when so positioned relative to one of said portions, means providing a rotational support for said composite roller, means actuable to cause movement of said portions between said positions, and means actuable to rotate said composite roller in at least one rotational direction when in the clamping position.

In one form of the invention said movement between said first and second positions is an axial movement having regard to the rotational axis of said composite roller. In another form the movement between said first and second positions is a relative rotational movement substantially about the rotational axis of said composite roller. For this purpose preferably said first portion has rotatably mounted at least around a portion thereof a portion of said second portion with said first and second portions when in the first position each having an axially extending region (preferably tongue-like) each of which is disposed substantially if not wholly in diametrically opposed positions relative to the other substantially about the rotational axis of said composite roller, and which when in said second position having said second portion rotated relative to said first portion so as to provide a clamping effect between said axially extending portions. In another form of the rotational mode said first portion and said second portion can both include a substantially cylindrical region which has an axially extending opening and in said first position said axially extending openings are in communication to allow the insertion of an appropriate region of head pelt through the openings to within the inner of the two cylindrical regions and such that when in said second position a longitudinal edge of said axially extending opening of one cylindrical region coacts with the opposite edge of the other cylindrical region to provide a clamping effect on said appropriate region of head pelt.

Preferably the means whereby said composite roller is rotatable is a flexible drive. Preferably a separate flexible endless drive is operable to move rotationally each of said first and second portions, said endless drive of at least one being drivable by a pneumatic cylinder and piston rod through a connection. Preferably two pneumatic cylinder and piston rod systems are actuable by a single control (for example on the larger of the two) to first act by virtue of a phasing relationship as means to cause movement of said portions to provide the clamping effect and then to act as means to cause rotation of said composite roller in one rotational direction, said two pneumatic cylinder and piston rod systems by virtue of their reciprocal relation to the associated flexible drive being also actuable (automatically or otherwise) to reverse and thereby cause a reverse movement of said portions in a reverse of the phasing of the movements thereof.

In a further aspect the invention consists in a method of engaging with a composite roller a worked up head region of the pelt of a carcass to be depelted by such a roller that will wind the pelt from at least the head with the inside of the pelt outwards, said method comprising the steps of taking the portion of the pelt to be gripped and positioning the same with respect to one component of the said composite roller and thereafter causing actuation of another part of said roller to thereby provide a clamping effect on said pelt.

BRIEF DESCRIPTION OF SEVERAL VIEWS OF THE DRAWING

Preferred forms of the present invention will now be described with reference to the accompanying drawings in which:

FIG. 1 is a side elevation of a first component (or portion) of a roller and a sectioned side elevation of the second component (or portion) of such an assembly which said assembly requires differential movement in a linear manner from the condition as shown in FIG. 1 in order to provide the required clamping effect, FIG. 2 is the section at A—A of FIG. 1, FIG. 3 is the section at B—B of FIG. 1, FIG. 4 is a section at C—C of FIG. 1, FIG. 5 is the section at D—D of FIG. 1, said, said sections not showing unsectioned regions in either direction, FIG. 6 is a similar view to that of FIG. 1 but showing the second component having been moved axially with respect to the same so as to provide the required clamping effect whereupon subsequently it is possible for the composite roller in the clamped condition when engaged with the pelt to be rolled about a common rotational axis, FIG. 7 is a side elevation of one component of a different form of second component, FIG. 8 is a view E—E of the second component of a roller assembly as shown in FIG. 7, FIG. 9 is a similar view to that of FIG. 7 but showing the first component of the roller assembly of that type, FIG. 10 is a view F—F of the first component (or portion) as shown in FIG. 9, FIG. 11 is a view G—G of the first component (or portion) as shown in FIG. 9, FIG. 12 is a perspective view of the two components of FIGS. 7 to 11, when in their non-clamping condition, the arrow showing the rotational direction to effect clamping of the second component i.e. as shown in FIG. 7 which achieves the clamping, FIG. 13 is a sectioned view in one axial direction of two concentric components or portions of a composite roller which shows the same having an axial opening or slot aligned to allow the engagement of a portion of the pelt therein, FIG. 14 is a similar view to that of FIG. 13 but showing the concentric components after a differential rotational movement which would achieve a clamping effect, FIG. 15 is an elevation view showing one form of appropriate mounting for a composite roller, the composite roller being of the type as depicted in FIGS. 1 to 6, FIG. 16 is a similar view to that of FIG. 15 but showing the form of composite roller as shown in FIGS. 7 to 12 which form is the most preferred form of the invention, FIG. 17 is a view HH with respect to FIG. 16 showing the means of pivotal adjustment of the assembly relative to its support mount, FIG. 18 is a similar view to that of FIG. 17 but showing a varied adjustment thereof and showing various statistical data, the X's denoting typical measured positions relative to the assembly of the nose flap of a worked up carcass head, the carcass being supported in the manner for example substantially as disclosed in my New Zealand patent specification No. 181447 from the V shaped spreader rail shown to the right of the assembly, the X's denoting the positions of the nose flaps of lambs, the triangles the positions of the nose flaps for hoggets and the dots denoting the positions of the nose flaps for sheep, FIG. 19 is a plan view of an assembly as shown in FIG. 16 in the direction II, the drawing omitting however a duplex chain which extends vertically upwards and also with regard to FIG. 19 out of the plane of the figure and tooth detail of the sprocket therefore, and similarly with the simplex sprocket and chain therefor, FIG. 19 also showing diagrammatically the connection axis of each piston rod to the appropriate chain engagement or connection member.

DETAILED DESCRIPTION OF PREFERRED EMBODIMENTS

Figure 20:
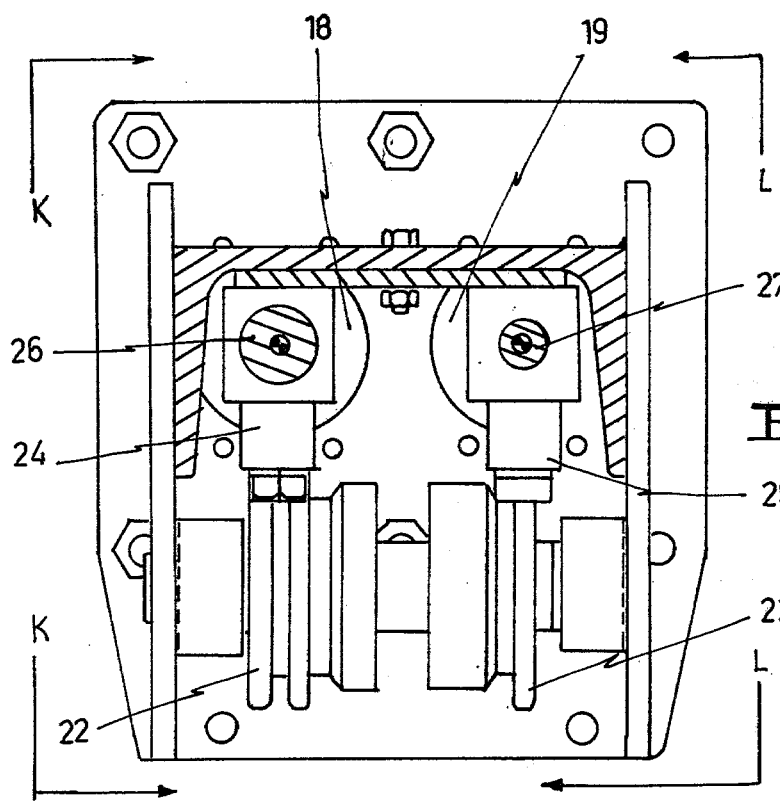
FIG. 20 is a view in the direction JJ as shown in FIG. 16 which shows the complementary sprockets to those denoted in FIG. 19, FIG. 20 adopting the same drawing conventions in respect of the duplex and simplex chains, the teeth of the sprockets and the piston rod axis, FIG. 20 however showing the general positioning of the cylinders that extend upwardly and which with respect to FIG. 20 lie backwards behind the plane of the figure.

In the preferred form of the present invention the carcass is preferably a sheep, hogget or lamb although it could be a deer or beef animal, for example, calf. Ideally the roller is of small diameter with respect to the size of the head which is to be cleared of the pelt in accordance with the present invention. Persons skilled in the art will recognise the difficulties that arise in obtaining a satisfactory method of gripping the nose region while still maintaining a high throughput. Persons skilled in the art will also recognise the difficulty in obtaining a satisfactory gripping of the nose while still maintaining a minimal diameter of roller. Any such solution to such difficulties should still enable such composite roller or roller gripping means to be used in the system of New Zealand patent specification No. 181447, and should be one which will obtain the necessary mechanical grip yet will enable the skin to be pulled evenly from either side of the head. Obviously for the purposes of the present invention a person skilled in the art will recognise that the gripping roller assembly of the present invention enables the skinning of the head with or without subsequent removal of the rest of the pelt by means of said roller. For this purpose therefore it may well be that a carcass to have the head only cleared using the composite roller can be suspended in ways other than those shown in New Zealand patent specification No. 181447 where the carcass is supported solely by the fore legs during the pelting operation.

Of course however the means and methods of the present invention should have applications with many other systems.

As previously stated at least the cheeks, lips, nostrils will be worked up so that the skin on the head can be subsequently removed by mechanical means and in particular the rotation of a roller assembly in accordance with the present invention after the lip and/or nostril region has been engaged therewith. Obviously in one aspect with the lip and/or nostrils grip it is not necessary for the roller to continue beyond the neck region as to clear the head all that is necessary is for the engaged region to be wound about the relatively small diameter roller up to and over the poll to remove skin from the nose cheeks around the eyes, horn stubs, ears etc.

The preferred forms of engagement in accordance with the present invention will now be described in more detail.

The form as shown in FIG. 1 through to FIG. 6 includes a first component 1 which has mounted thereon a stepped key 2 which is receivable within the groove 3 of the second component 4. As can be seen particularly from FIGS. 1 and 6, the second component 4 can be moved axially with respect to the first component 1 to thereby provide the clamping over the stepped region 2 by the keyway and its surround of the second component 4. Throughout such axial movement ideally the keyway is guided by a member 5 which is anchored in the first component 1.

The drawings it is believed clearly show the mode of operation i.e. the roller assembly would be presented in the form shown in figure to the worked up head, the lip and/or nostril region would be pulled, for example, by tongs onto the stepped region 2 of the first component whereupon means would be actuated to cause the differential axial movement whereupon the clamping condition of FIG. 6 would be achieved prior to the roller commencing to roll as a unit. Ideally some system should be provided such that clamping must be achieved before the rolling of the unit as such can commence.

FIGS. 7 to 12 show the most preferred form of the present invention whereby the second component 6 includes a portion 7 which is less than half of the diameter of the shaft 6. Shaft 6 is adapted to be rotatable differentially with respect to the sleeve member of FIG. 9 which sleeve member 8 includes a portion 9 which is capable of clamping against or substantially against the portion 7 of the second component thereby effecting the clamping condition.

The composite construction as shown in FIG. 12 shows best how it operates. In the condition as shown in FIG. 12 a gap is presented between the components 7 and 9 which enables an operator when the animal to be pelted is appropriately positioned relative thereto to have the worked up nose and/or nostril regions pulled, for example, by tongs therebetween whereupon the differential rotational movement can occur to provide the clamping effect between the members 7 and 9. The arrow in FIG. 12 shows the direction of rotation of the member 7. It should be remembered however that the member 7 is set from the centre of rotation of the shaft 6 and hence an arcuate type movement will occur to provide the clamping effect. The members 7 and 9 once clamped form an effective composite yet still small in diameter roller assembly.

Ideally the composite roller shown in FIGS. 7 to 12 is a portion of a machine which is capable of following the contour of the animal during the roller depelting of more than solely the head regions of the carcass. Obviously for speed of operation some clutching or other mechanism should be provided whereby the shaft 6 is actuated to rotate to provide clamping and the sleeve member 8 does not rotate therewith until such time as clamping has been achieved between members 7 and 9. For this purpose some air cylinder or the like could be linked for example by a chain to the sleeve 8. Obviously all sorts of safe-guards could be provided so that the differential movement is such that it presents no substantial risk to operators hands and is also such that there is no risk of substantial momentum being built into the system until such time as clamping has been completed.

FIGS. 13 and 14 show a varied form which is really just a hybrid of the system as shown in FIGS. 7 to 12. With this there is a first component 10 and coaxially located relative thereto a second component 11. Each of the components 10 and 11 includes a longitudinal opening 12 and 13 respectively which can be offset as shown in FIG. 14 or aligned in FIG. 13. When in the condition of FIG. 13 a portion of a pelt can be stuffed there into and thereupon differential rotational movement can provide the clamping condition as shown in FIG. 14. Obviously it is possible to have the openings 12 and 13 extending right to the end of of the concentric members and also it is possible to have similar openings diametrically opposed therefrom, so that in effect a system substantially as shown in FIGS. 7 through to 12 is obtained.

From the foregoing therefor it can be seen that various modes of differential movement can be provided to achieve a clamping effect yet which in the clamp condition will still provide a roller assembly capable of achieving the purpose required owing to its relatively small overall composite diameter. Obviously also within the scope of the present invention are variations whereby the composite roller or components thereof can be tapered, disced, ballooned or in any other way modified so as to depart from a straight parallel relationship so as to achieve for any particular animal, optimum pelt accumulation as the pelt is rolled about the assembly.

For the best results using such a roller assembly it can be suspended from overhead relative to the animal or can be supported from the ground so as to be capable of moving at right-angles to the line of the movement of the chain to which the carcass to be pelted is engaged or any other arrangement between the carcass to be pelted and the roller assembly whereby the roller is positioned such that the head is kept in a resisting tension with respect to the pelt as the pelt is wound about said roller. Such a requirement is deemed necessary or desirable in order to avoid twisting.

FIG. 15 shows a form of mounting which while adjustable as will be described in relation to the most preferred embodiment as shown in FIGS. 17 and 18 does not move in the manner outlined in respect of the spiked roller disclosed in our New Zealand patent specification No. 181447. It does nevertheless however demonstrate one mode of drive and mounting for the apparatus. In FIG. 15 can be seen that similar pneumatic cylinders to that shortly to be described in regard to FIGS. 17 and 18. A feature of the type of composite roller as shown in FIG. 15 however is that the same is self constraining as far as rotation is concerned and hence it is a simple matter for a pneumatic or hydraulic cylinder or a solenoid to actuate the necessary axial movement prior to or substantially simultaneously with the actuation of means which will rotate the composite roller. Such a means of rotation as shown in FIG. 15 is preferably a pneumatic drive connected to an endless flexible drive which will be shortly hereinafter described with reference to and in particular FIGS. 17 to 23.

In the preferred form of the present invention the actual composite roller takes the form as shown in FIGS. 7 to 12. For the purpose of actuating the two components it can be seen that the outer portion 8 with its extended member 9 is rotatably mounted about the portion 6 of the other portion which includes the extension 7. The two rotational drives are as a consequence of rotation of a simplex chain sprocket 15 in the case of the member with portions 8 and 9 and a duplex chain sprocket 16 which is keyed similarly but in this case to the portion 6 which has the extended region 7. The various seals and bearing mounts can be well appreciated by a person skilled in the art. Referring however to FIG. 19 no actual chains as such are shown. It should be appreciated however that the chains would when considering FIG. 19 rise out of the plane of the figure. Each chain however and hence the associated sprocket 16 or 15 is movable under the reciprocal action of the associated piston rod from the larger pneumatic cylinder 18 in the case of the duplex chain and the smaller pneumatic cylinder 19 in the case of the simplex chain. The means of connection of the piston rods can best be understood by referring to FIGS. 21 and 22 where there is the duplex chain 20 and the simplex chain 21 albeit shown only in dotted outline together with their associated upper sprockets 22 and 23 respectively, but showing the normal link type connection of connecting members 24 and 25 respectively to which the piston rods 26 and 27 can be associated.

Figure 23:
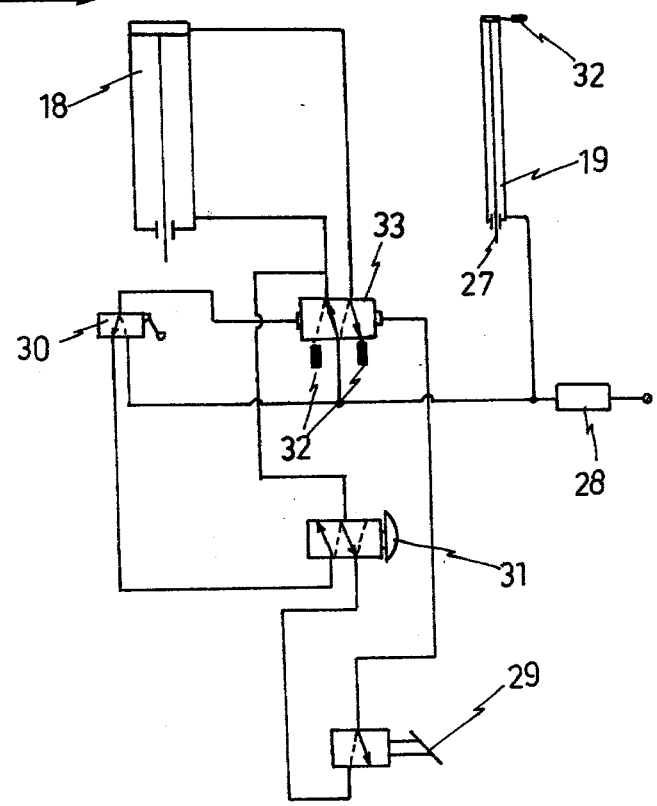
FIG. 23 shows the pneumatic circuit suitable for such an arrangement.
Figure 21:
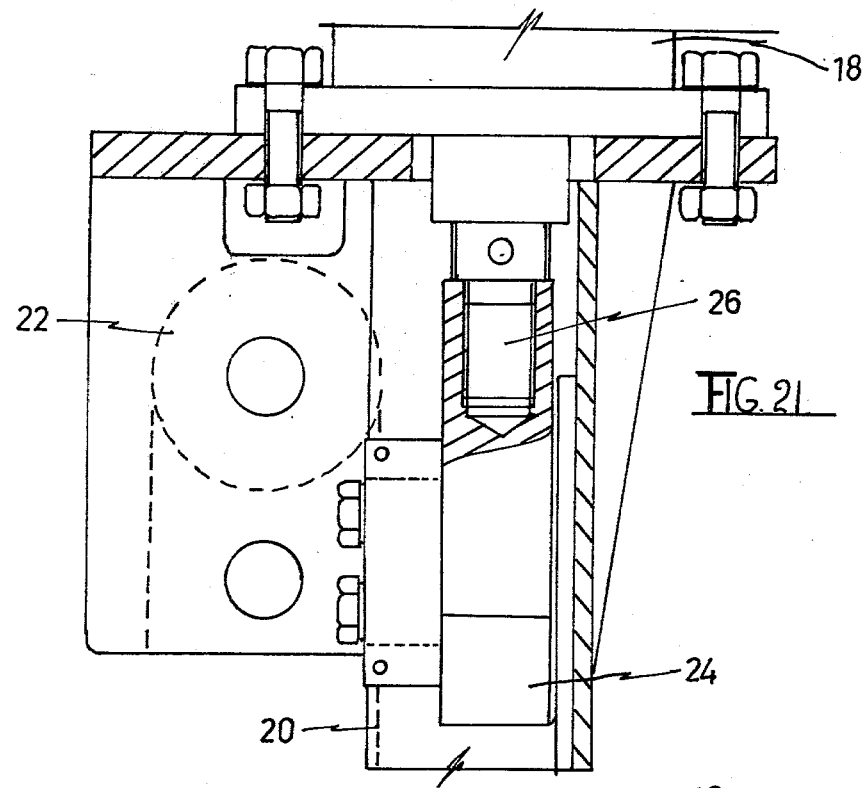
FIG. 21 is a simplified diagrammatic view in the direction KK denoted in FIG. 20 showing the means of connection of the piston rod to the duplex chain, the duplex chain being shown as is also the duplex sprocket in dotted outline, the connection by virtue of the piston rod being in its raised condition being substantially at a position near the sprocket so that when the piston rod extends down a sufficient degree of rotational movement commensurate with the stroke of the rod of the top sprocket and the complimentary lower sprocket and hence the composite roller results.
Figure 22:
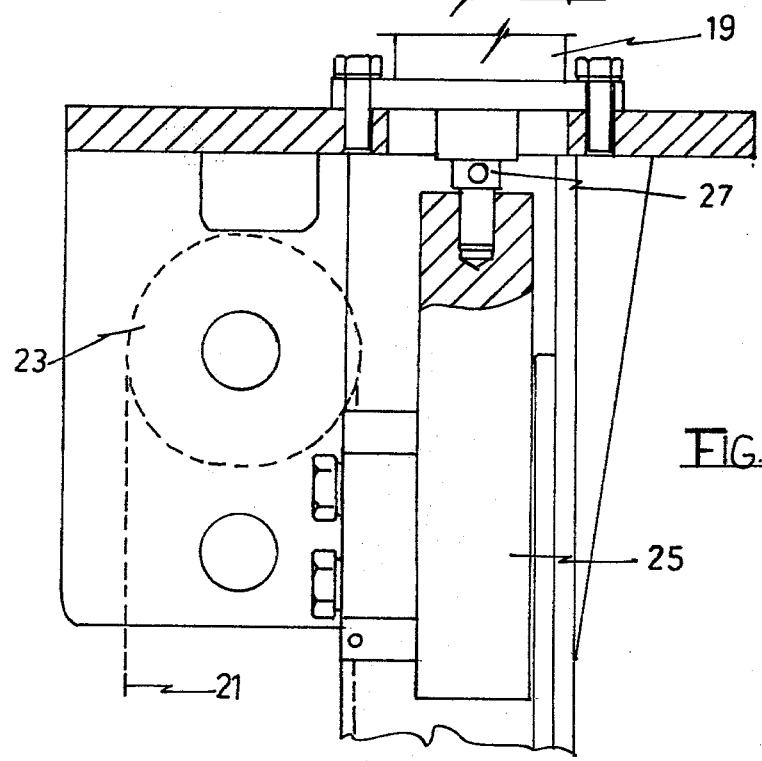
FIG. 22 is a similar view to that of FIG. 1 but taken in the direction LL and showing in dotted outline the simplex sprocket and the simplex chain.

Turning to FIG. 23 therefore it can be seen that a main line pneumatic system of the like 28 can provide a single positive upward stroke to the ram 27 of the pneumatic cylinder 19 which, since it is a constantly pressurized single acting system, has a tendency always therefore to be at its upper most position. It can be seen however that by selectively applying positive pressure to one or other side of the main cylinder which is of a more powerful kind and is double acting the affect of any pressure in the smaller cylinder 19 can be over-ridden thereby allowing the required operation using a foot valve 29 to effect the required actuations. A stroke control valve 30 could be provided as also would an emergency valve 31 with a manual reset. Various airbleed silencers 32 are shown in the flow diagram with the main valve being denoted by reference numeral 33. A person skilled in the art therefore having reference to FIG. 23 will appreciate how any downward movement for example of the main piston rod will rotate the portion 7 until such time as the same clamps against the extension 9 through any appropriately positioned piece of head felt and continued downward movement of the main piston rod would overcome any resistance resulting from the pressure in the first pneumatic cylinder 32 thus resulting in the required grip and then the phased rotation to effect the required scalping. Of course upon the return of the main piston ram the reverse procedure automatically ensues but because the cylinder 19 is single acting the grip is released somewhat at least during the reversing.

Other forms of actuation and drive are of course possible, but the simple pneumatic system previously outlined fits in admirably with the normal freezing work situation. It also has an advantage that it means that no electrical componentry is necessary, all logic for the system being inherent in the actual pneumatic circuitry.

From the foregoing then it can be seen that the present means and methods of the present application provides methods which should find widespread application in the freezing industry.

We claim:

1. Apparatus for scalping the carcass of an animal such as a sheep, comprising
    composite means providing a composite roller capable of being machine rotated in at least one rotational direction, said composite roller having a first portion and a second portion movable with respect to said first portion between one position where an appropriate region of head pelt of an animal to be scalped can be positioned relative to one of said portions, and another position whereby the two portions can coact to clamp said appropriate region of head pelt when so positioned relative to one of said portions, means providing a rotational support for said composite roller, means actuable to cause movement of said portions between said positions, and means actuable to rotate said composite roller in at least one rotational direction when in the clamping position.

2. Apparatus as claimed in claim 1 wherein said movement between said first and second positions is an axial movement having regard to the rotational axis of said composite roller.

3. Apparatus as claimed in claim 1 wherein the movement between said first and second positions is a relative rotational movement substantially about the rotational axis of said composite roller.

4. Apparatus as claimed in claim 3 wherein said first portion has rotatably mounted at least around a portion thereof a portion of said second portion with said first and second portions when in the first position each having an axially extending region each of which is disposed substantially if not wholly in diametrically opposed positions relative to the other substantially about the rotational axis of said composite roller, and which when in said second position having said second portion rotated relative to said first portion so as to provide a clamping effect between such axially extending portions.

5. Apparatus as claimed in claim 4 wherein said first portion is machine actuable to rotate the composite roller when in said second position.

6. Apparatus as claimed in claim 3 wherein said first portion and said second portion both include a substantially cylindrical region which has an axially extending opening, and in said first position said axially extending openings are in communication to allow the insertion of an appropriate region of head pulp through the openings to within the inner of the two cylindrical regions, and such that when in said second position a longitudinal edge of said axially extending opening of one cylindrical region coacts with the opposite edge of the other cylindrical region to provide a clamping effect on said appropriate region of head pelt.

7. Apparatus as claimed in any one of claims 2, 3, 4, 5 and 6 wherein said composite roller is rotatable by a flexible drive.

8. Apparatus as claimed in claim 4 wherein a separate flexible endless drive is operable to move rotationally each of said first and second portions, said endless drive of each being drivable at least in one direction by a pneumatic cylinder and piston rod through a connection, the two pneumatic cylinder and piston rod drives being actuable by a single control to first act by virtue of a phasing relationship as means to cause movement of said portions to provide the clamping effect, and then to act as means to cause rotation of said composite roller in one rotational direction, said two pneumatic cylinder and piston rod drives by virtue of their reciprocal relation to the associated flexible drive being also actuable to reverse and thereby cause a reverse movement of said portions in a reverse of the phasing of the movements thereof.

9. Apparatus as claimed in claim 4 wherein said first portion is rotatable by a flexible endless drive, said flexible endless drive being drivable by a connection to a reciprocal double acting pneumatic cylinder and piston rod system, said second portion is rotatable by a separate flexible endless drive, said separate flexible drive being drivable in one direction only by a connection to a second pneumatic cylinder and piston rod system which is less powerful, said second system being substantially constantly pressurized so as to act on said separate flexible endless drive in said one drivable direction, and valving means to actuate the first mentioned cylinder and piston rod system to move selectively in one of the two drive direction, the construction and arrangement being such that when actuated to rotate said first portion in the depelting direction of the composite roller that portion upon clamping against said second portion, or any pelt interposed therebetween, overides said second system to thus rotate the two portions in unison.

10. A method of engaging with a composite roller a worked up head region of the pelt of a carcass to be depelted by such a roller that will wind the pelt from at least the head with the inside of the pelt outwards, said method comprising the steps of taking the portion of the pelt to be gripped and positioning the same with respect to one component of the composite roller and thereafter causing actuation of another part of said roller to thereby provide a clamping effect on said pelt.

* * * * *